(12) United States Patent
Volpe et al.

(10) Patent No.: US 10,506,044 B1
(45) Date of Patent: Dec. 10, 2019

(54) STATISTICS COLLECTING ARCHITECTURE

(71) Applicant: Amazon Technologies, Inc., Seattle, WA (US)

(72) Inventors: Thomas A. Volpe, Austin, TX (US); Mark Anthony Banse, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 209 days.

(21) Appl. No.: 15/391,461

(22) Filed: Dec. 27, 2016

(51) Int. Cl.
*H04L 29/08* (2006.01)
*H04L 12/861* (2013.01)
*H04L 12/859* (2013.01)

(52) U.S. Cl.
CPC ...... *H04L 67/1097* (2013.01); *H04L 47/2475* (2013.01); *H04L 49/9031* (2013.01)

(58) Field of Classification Search
CPC .... G06F 15/173; G06F 15/17331; H04H 1/04
See application file for complete search history.

(56) References Cited

U.S. PATENT DOCUMENTS

| | | | | |
|---|---|---|---|---|
| 6,351,471 | B1* | 2/2002 | Robinett | H04N 21/8547 370/468 |
| 7,490,150 | B2* | 2/2009 | Orii | G06F 11/349 709/224 |
| 7,603,488 | B1* | 10/2009 | Gravenstein | G06F 12/0223 710/22 |
| 10,055,264 | B2* | 8/2018 | Pope | G06F 9/546 |
| 2015/0058434 | A1* | 2/2015 | Liao | G06F 15/17331 709/212 |

* cited by examiner

*Primary Examiner* — Getente A Yimer
(74) *Attorney, Agent, or Firm* — Kilpatrick Townsend & Stockton LLP

(57) ABSTRACT

Disclosed are techniques that can be used to efficiently collect statistical or other information from many registers in an integrated circuit without substantially burdening a central processing unit. The techniques can use logic that, without being directed by a central processing unit, can periodically collect information from a plurality of disparate registers of an integrated circuit and move the contents of the registers to memory (e.g., volatile memory accessible by the central processing unit) other than the registers.

22 Claims, 8 Drawing Sheets

STATISTICS COLLECTING ARCHITECTURE

BACKGROUND

Network devices, such as network switches, are used to transport network packets through computer networks. Network devices can receive network packets and, based on information in each network packet, such as an address, forward the network packet to an appropriate different network device. Modern network devices can forward a large number of packets per second and, while forwarding the packets, collect statistical information. It is desirable to collect statistical information corresponding to the forwarding of the network packets to, for example, identify congestion, identify errors, and/or to generally monitor network health. Collecting, storing, and processing this statistical information can be burdensome for network devices. Thus, there is a need for improvement in the field of network devices.

BRIEF DESCRIPTION OF THE DRAWINGS

Various embodiments in accordance with the present disclosure will be described with reference to the drawings, in which.

DETAILED DESCRIPTION

Figure 1:
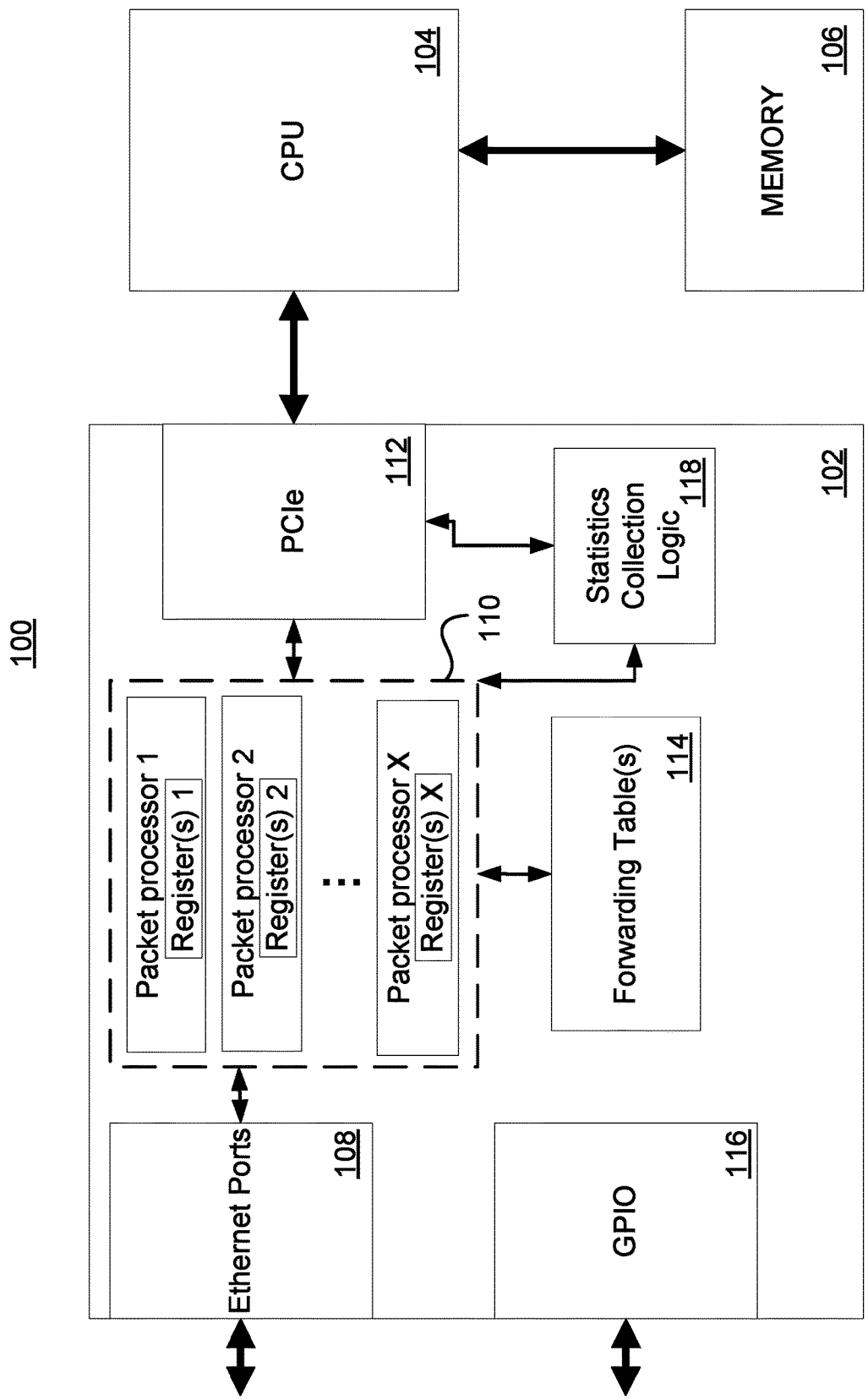
FIG. 1 illustrates an example network device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Network devices, such as network switches or network routers, can be used to forward received network packets to one of several destinations. As network devices advance, so do capabilities of network devices to forward large volumes of network packets at increasingly higher speeds. Certain network devices may be capable of forwarding tens of billions of network packets per second. For each network packet, a decision can be made, by the network device, as to where to best forward each network packet (e.g., to an egress interface, to a destination device, etc.). Furthermore, modern network devices may be capable of processing many disparate types of network packets, such as Internet Protocol version 4 (IPv4), IPv6, Address Resolution Protocol (ARP), AppleTalk, MPLS, Precision Time Protocol (PTP), etc.

While routing upwards of billions of network packets per second of different types, network devices may also collect statistical information regarding the network packets. For example, statistical information may be accumulated regarding a number of network packets dropped, a number of network packets forwarded to certain address(es), a number of network packets forwarded to certain ports, a number of different types of network packets forwarded, a number of exceptions, etc. In certain embodiments, network devices may store millions of pieces of statistical information in order to monitor network health, identify locations and/or periods of heavy congestion within a network, identify errors/failures, or for other reasons pertaining to operation of the network device.

As billions of network packets are forwarded by a network device, large amounts of statistical information can be accumulated and periodically analyzed by a processor. However, accumulating large amounts of the statistical information from across various components of the network device, storing and moving such large amounts of the statistical information from the network device can be burdensome for a network device. For example, a network device may maintain local registers (e.g., flip-flops) to maintain and update the statistical information at speeds necessary to keep up with a rate of forwarded network packets. The registers may constitute physical space on an integrated circuit and may therefore occupy a substantial percentage of an integrated circuit used to enable functionality of a network device. Furthermore, accessing the registers to copy the information contained therein can become burdensome for a processor. For example, a processor may individually address each register across the integrated circuit of the network device to access statistical information contained therein to store the statistical information in a buffer or at a memory location for later processing. Information may periodically be copied and then cleared from the registers to prevent register overflow.

In some network devices, a processor may work in conjunction with one or more memory controllers wherein the processor, for each register, requests information to be copied from the register and stored in a buffer/memory location and each register cleared. The information, after being collated from several different registers that may be dispersed across a network device integrated circuit, can be copied to a second memory location for later analysis by the processor. Furthermore, any of the actions previously disclosed can be implemented via two separate commands, a command to perform the action and an acknowledgement that the command was received and/or the action was completed. Thus, servicing a large number of commands for accessing and collecting statistical information stored in the registers across an integrated circuit of the network device can become burdensome for a processor (e.g., it may consume many computing cycles of the processor), for one or more buses, and/or for one or more memory controllers. Furthermore, periodically accessing and collecting statistical information using a processor can be disruptive for both the processor and processing module(s) collecting the statistical information from registers. An example processing module may be a packet processor configured to de-encapsulate, process, encapsulate, and/or forward network packet(s).

In certain embodiments, a register size may be selected such that registers holding statistical information can accumulate information over a relatively long period of time, thus reducing a number of overflows of the registers and corresponding interference to packet processing operations of a network device that may result from the servicing of the overflowing registers. For example, processor(s) or processing module(s) may be interrupted from processing of network packets upon an overflow of the statistics registers, in order to service an overflowing register (e.g., the processor(s) may move the contents of the register to another storage medium and clear the register. However, integrated circuit die size(s) may increase proportionally to size(s) of the registers). Thus, simply using larger registers to reduce the interference from the overflowing registers may be uneconomical. Furthermore, extending time periods between collecting statistical information may also reduce processor visibility into operation of the network device to undesirably long time period(s).

Disclosed are techniques that can be used to efficiently collect statistical or other information from a large number of registers without substantially burdening a central processing unit. The techniques can use logic that, without being directed by a central processing unit, can periodically collect information from a plurality of disparate registers of an integrated circuit and move the contents of the registers to memory (e.g., volatile memory accessible by the central processing unit) that is different from the registers. The periodicity of the moving and clearing of the contents of the registers can be selected to prevent register overflow resulting from collecting of statistical information during operation of a network device. The techniques can accumulate large amounts of data spread across an integrated circuit. The techniques can also minimize an amount of area needed for integrated circuit(s) of a network device, or other devices, by implementing smaller registers for capturing information. Furthermore, the logic can free a central processing unit from tasks related to collecting information from the registers.

Example Network System/Device

FIG. 1 illustrates an example system 100 that can be integrated into, for example, a network device such as a network switch. System 100 includes an integrated circuit 102 that can be an Application Specific Integrated Circuit (ASIC). Integrated circuit 102 can include several processing module(s), such as packet processors 110, that can be configured to processes and/or route network packets. Processing modules, as used herein, can each be a circuit that is used to process information and can each be associated with one or more registers. The registers can collect information generated by the processing modules, such as statistical information. Integrated circuit 102 can be coupled to a central processing unit (CPU) 104 and/or memory 106. Each of integrated circuit 102, CPU 104, and/or memory 106 can be manufactured on a separate integrated circuit die. For example, CPU 104 can be manufactured on an integrated circuit die, integrated circuit 102 can be manufactured on a different integrated circuit die and memory 106 can be manufactured on one or more different integrated circuit dies. In certain embodiments, CPU 104 and the integrated circuit 102 (and/or memory 106) may be implemented on the same integrated circuit die.

CPU 104 can orchestrate certain operations of the integrated circuit 102. For example, CPU 104 can execute one or more instructions stored in memory 106. The instructions can include, without limitation, an operating system, instructions to modify operations of integrated circuit 102 including, e.g., changing forwarding destinations/mechanisms of packet processors 110, collecting information (such as statistics or debugging information) from integrated circuit 102, and/or commanding powering of certain modules of integrated circuit 102. By separating CPU 104 onto a separate circuit and/or die, CPU 104 can be developed, manufactured, and/or improved independently from integrated circuit 102. Furthermore, integrated circuit die size(s) can be restrained by not including component(s) of CPU 104.

CPU 104 can include a processing core configured to implement x86, ARM, or other instruction sets in any combination. CPU 104 can include a field programmable gate array (FPGA), digital signal processor (DSP), programmable logic device (PLD), ASIC, or other. In certain embodiments, CPU 104 can include a graphics processing unit (GPU) or other parallel processor(s). CPU 104 can include memory including cache, non-volatile, volatile, primary, secondary, or other. Memory 106 can be external memory that can be read from or written to by integrated circuit 102 and/or CPU 104. Memory 106 can be used to store data generated by integrated circuit 102 for later processing by CPU 104, for example.

Integrated circuit 102 can include Ethernet ports 108 that can be used to send or receive network packets, such as IPv4, IPv6, Multiprotocol Label Switching (MPLS), or other network packets. In certain embodiments, integrated circuit can include tens or hundreds of Ethernet ports 108. Packet processors 110 can be coupled to Ethernet ports 108 via an internal bus to enable network packets to be received via Ethernet ports 108 to be processed at packet processors 110 and/or be transmitted from packet processors 110 via Ethernet ports 108. Some or all of packet processors 110 can each be configured to parse, encapsulate, de-encapsulate, capture, drop, forward, or perform other operations on a network packet on a packet by packet basis. In certain embodiments, integrated circuit 102 can include tens or hundreds of packet processors 110. Packet processors 110 (and the remainder of integrated circuit 102) can be operable to process network packets at 1, 10, 100, or 1,000 Gbps (Gigabits per second), for example.

Each of packet processors 110 can include one or more registers, as illustrated. The registers can be flip-flops or other hardware constructs to enable values of the registers to be updated concurrent with operating speeds of packet processors 110. As previously recited, integrated circuit 102 may have tens or hundreds of packet processors 110 each corresponding to one or more registers. Thus, the size of the registers can have a directly proportional impact on a physical size of integrated circuit 102 (and thus a cost of integrated circuit 102).

The registers can store data associated with one or more operations of packet processors 110 in various combinations. For example, one or more registers can be associated with certain ones of packet processors 110, all of packet processors 110, or one of packet processors 110, in any combination. In certain embodiments, each of packet processors 110 can be substantially similar in operation, enabling synthesis of a relatively large parallel array of packet processors 110, each with similar capabilities.

Forwarding table(s) can be stored onboard memory of integrated circuit 102 and can be accessed by packet processors 110 to, for example, select an address or interface for forwarding of received network packet(s). Although not shown, forwarding table(s) may be integrated within each of the packet processors 110. Peripheral component interface express (PCIe) controller 112 can enable relatively high bandwidth communications between integrated circuit 102, CPU 104, and/or memory 106. Although not illustrated, CPU 104 can include a PCIe controller or other interface controller. General purpose input/output (GPIO) 116 can enable various tertiary interface functions of integrated circuit 102 including discrete, serial, or other interface schemas.

The registers corresponding to packet processors 110 can store statistical information pertaining to one or more operations of packet processors 110 including, for example, a number of dropped packets, a number of forwarded packets, a number of received packets, a number of trapped packets, a number of packets forwarded to a specific address or specific prefix, a number of packets received from a specific address, a number of exceptions, or an average time to process a packet. Furthermore, in certain instances, the registers corresponding to packet processors 110 can also store various state information associated with the packet processors 110. For example, certain registers may reflect information associated with the current usage or availability of certain buffers and/or entries of the packet processors 110.

In certain embodiments, CPU 104 can access each of the registers to periodically collect statistical information stored therein. For example, CPU 104 may transmit a command addressing each individual register to request the information stored therein. Integrated circuit 102 may respond with an acknowledgement (Ack) and transmit the requested data to CPU 104. Upon completion of transmission of the data, integrated circuit 102 may send a write complete message to CPU 104 and CPU 104 may respond with an Ack. CPU 104 may then request that the contents of the register be cleared in order to, for example, prevent the register from overflowing. Integrated circuit 102 may respond with an Ack that a register has been cleared. The contents from many registers can be stored in a buffer (not shown) of integrated circuit 102. Integrated circuit 102 may signal CPU 104 (via a message or interrupt, for example) when the buffer has reached a capacity. CPU 104 may Ack the signal indicating that the buffer has reached the capacity. CPU 104 may then request that the contents of the buffer be transferred to a memory location for later access by CPU 104. Integrated circuit 102 may respond with an Ack when that transfer has completed.

In certain embodiments, in order to minimize or avoid CPU 104 oversight as described in the previous paragraph, as well as to alleviate memory usage and interface bandwidth, dedicated statistics collection logic 118 may be included within integrated circuit 102. Statistics collection logic 118 can, independently or semi-independently from CPU 104, collect information from registers of disparate modules (such as packet processors 110) of integrated circuit 102. As disclosed herein, statistics collection logic 118 can, without directly being commanded by CPU 104, copy or induce copying of contents of the registers to a buffer or other memory location. In certain embodiments, inducing by the statistics collection logic 118 can refer to writing the contents or information from the registers to a bus that is coupled to the buffer, such that the information is transmitted to the buffer. After the contents of the registers are copied, statistics collection logic 118 can signal CPU 104 that the statistical information is ready for CPU 104 to access. The terms "independently" and "semi-independently," as used herein, indicate that statistics collection logic 118 can perform a plurality of operations to move contents of several registers to a memory location without being commanded by CPU 104 for every move. For example, CPU 104 may provide statistics collection logic 118 with a designation of a memory address to copy the contents of the register(s) to and/or time period(s) at which the register(s) should be read and/or cleared. After receiving this information, statistics collection logic 118 can perform operations to collect and move contents of registers without further commands from CPU 104. In certain embodiments, statistics collection logic 118 or additional logic associated with the statistics collection can be fully or partially included within packet processors 110, as disclosed herein.

Statistics information can include counts of events that are associated with one or more processor(s)/module(s)/pipeline(s) distributed across an integrated circuit. Non-limiting examples of events include numbers of forwarded network packets, numbers of forwarding table hits, numbers of cache hits, numbers of power states, numbers of network packets received at certain ports, numbers of operations (or operation types), numbers of errors, and numbers of interrupts. Statistics information can also include a number of bytes, such as a number of bytes forwarded to a certain address or forwarding table entry. The statistics information can include a number of bytes received or transmitted from certain ports. In certain embodiments, statistics information can include, for example, a percentage usage of memory, certain resource(s), a buffer, or a pipeline. Furthermore, in certain instances, the statistics information can also include state information associated with the packet processors 110. For example, certain registers may reflect information associated with the current usage or availability of certain resources, such as buffers and entries associated with the packet processors 110.

Example Packet Processor

Figure 2:
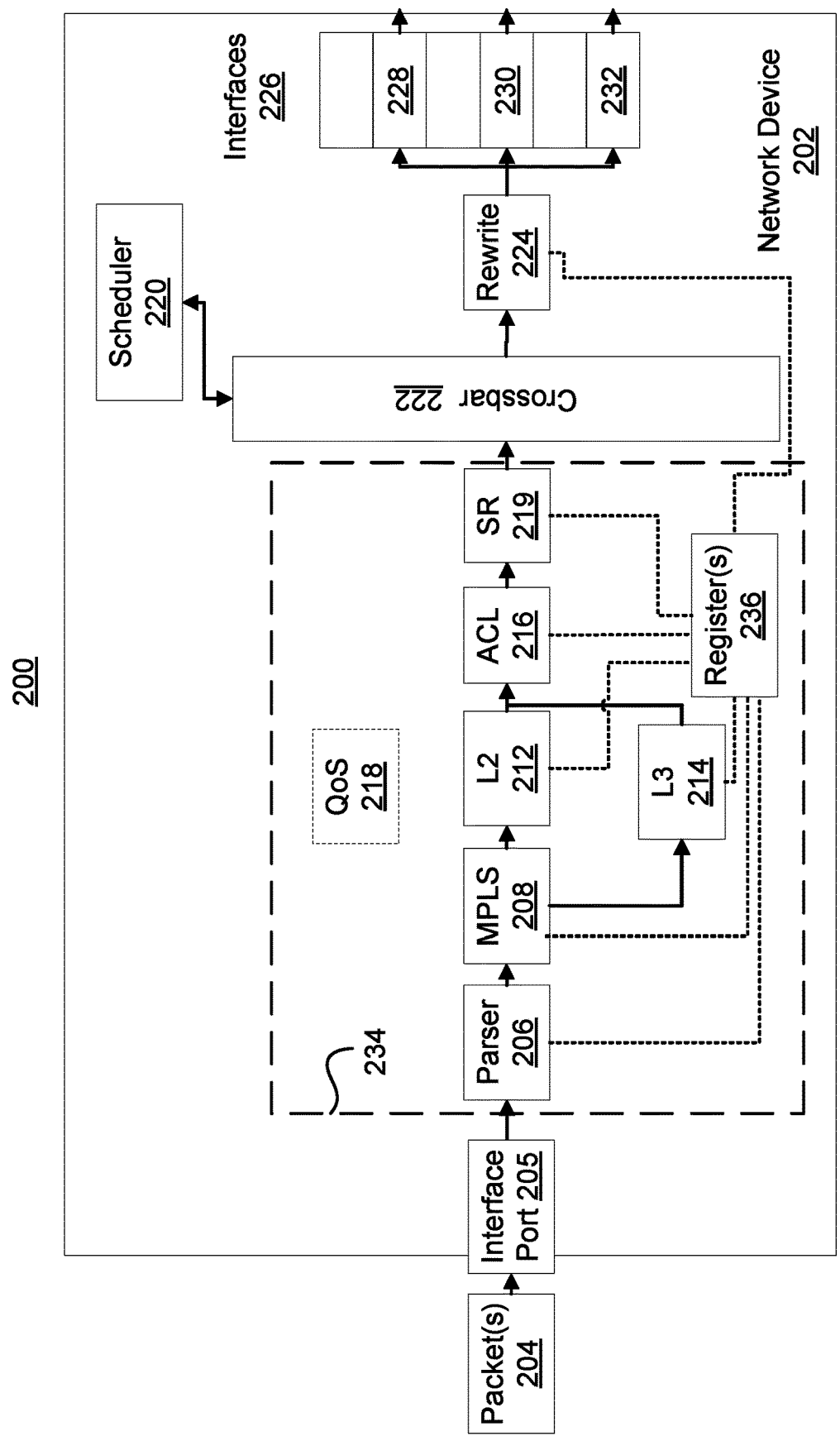
FIG. 2 illustrates an example network device with a packet processor.

FIG. 2 illustrates a logical block diagram 200 illustrating techniques for processing and forwarding of network packets. The techniques of diagram 200 can implement packet processor 234 that can be similar to one of packet processors 110 of system 100. Packet processor 234 can also be implemented using pipelined operations to support packet processing speeds for high-speed network data transfer operations, including forwarding information lookups and other packet processing operations. Packet processor 234 can be implemented to provide forwarding of network packets as part of the data plane so that forwarding may be performed without software-based techniques.

Network packet(s) 204 can be received via a network interface, such as an interface port 205. Interface port 205 can provide a physical layer (PHY) interface. Media Access Control (MAC) layer interface can be implemented via interface port 205. Network packet(s) 204 can be analyzed to detect valid flows and segment the flow into datagrams (e.g., packets/frames). For instance, the PHY layer may receive and transmit data across physical connections (e.g., such as electrical signals received over twisted-pair coaxial cable or optical signals received over optical fiber). The PHY layer may implement different techniques dependent on the speed or type of network interface configuration (e.g., Ethernet 10 base-T, 100 base-TX, and 100 base-T forms), such as encoding, multiplexing, synchronization, clock recovery, and/or data serialization. Various signaling standards, such as IEEE 802.2, may govern the performance of the PHY layer consistent with the open systems interconnection (OSI) model for communications. The MAC layer may delimit frames and packets from the flow of data. Error checking may also be implemented at the MAC layer, checking for different errors, such as frame check sequence (FCS), interframe gap enforcement, and frame preambles.

Packet parser 206 can receive network packets and separate the packet header from the packet payload. Packet parser 206 can parse the packet header to determine and/or extract data for making forwarding decisions for the packet. For example, packet parser 206 can extract different layer headers (e.g., L2 and L3 headers) included in an Internet protocol (IP) version 4 packet, such as the source MAC address, the destination MAC address, the source IP address, the destination IP address, and port numbers. Using information from the layer headers, the network packets can be forwarded to Multiprotocol Label Switching (MPLS) module 208. MPLS module 208 can use MPLS techniques to make forwarding decisions based on information in the header. In certain cases, an MPLS tunnel can be exited and packets can be forwarded based on L2 or L3 routing decisions respectively at L2 forwarding module 212 or L3 routing module 214. In certain instances, network packets may pass through certain logical blocks or stages of the packet processor 234 without being processed. For example, if the network packet received at the MPLS module 208 does not have an MPLS header, the MPLS module 208 may merely pass the packet through to the next block/stage of the packet processor 234.

A network packet can be forwarded to L2 forwarding module 212 or L3 routing module 214 in order to determine forwarding and tunneling decisions based on information in the packet header (e.g., packet metadata) extracted by packet parser 206. For example, L2 forwarding module 212 can locate appropriate forwarding information through the use of Forwarding Table(s). Forwarding Table(s) can, in certain embodiments, be logically partitioned within L2 forwarding module 212. L2 forwarding module 212 can perform lookups for data in layer 2 (L2) portions of the packet to perform L2 forwarding. L2 forwarding may access a MAC address table in forwarding tables (not shown) to perform two lookups (which may be in parallel or in series). These forwarding tables can also benefit from features of the disclosure. The first lookup may be performed with a key extracted from the packet header at packet parser 206 (e.g., a VLAN and source MAC address), to determine whether an entry for the packet is present in Forwarding Table(s). If the source MAC address is unknown, then a mapping determination may be made to map the source MAC address to a port identified in the packet header. If the MAC address is known but attached to a different port than indicated by the MAC address table, then an operation may be performed to move the source MAC address to the port identified in the packet header. Otherwise, the MAC address is known in the MAC address table. Another lookup to the MAC address table may also be performed at another key (the VLAN and the destination MAC address). The network packet may be forwarded if the MAC address table contains an entry for the destination MAC address owned by a network device (otherwise other operations may be performed, such as trapping the network packet for the CPU, bridging the packet out of a listing interface, or flooding out of all ports and a spanning tree protocol (STP) forwarding state). L3 routing module 214 can perform lookups for data in layer 3 (L3) portions of the packet to perform L3 forwarding. For example, IP headers for the packet may be evaluated with respect to entries and tables such as a routing or next hop table, to determine forwarding to be performed. The previous examples of packet forwarding are not exhaustive, as many other forwarding techniques may be employed, including, but not limited to, forwarding for spanning tree protocol (STP) state checking, access port VLAN handling, VLAN membership checking, MAC2ME lookup, broadcast/multicast forwarding to a host CPU for the switch, tunnel start/termination lookup, longest prefix match, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and front/or various other destination resolution lookups. As a packet processor 234 makes forwarding decisions about a network packet, the decisions can be maintained as packet metadata. The packet metadata can be provided to scheduler 220 for scheduling determinations.

Forwarding Table(s) may be implemented in one or multiple storage devices, such as various memory devices (e.g., a CAM, such as TCAM, and/or random access memory) to store table data for performing different forwarding decisions. Forwarding Table(s) may include a VLAN table, MAC address table, routing table, adjacency table, next hop table, tunnel start table, virtual routing and forwarding identifier table, tunnel termination table, and/or actions table. Each of these different tables may be utilized to retrieve or determine packet forwarding decisions, tunneling decisions, and associated modifications that may need to be made to network packets.

Access Control List (ACL) module 216 can, based on rules, compare information obtained from a network packet header or elsewhere to make a determination if the network packet header is allowed to be directed to specific destination(s). For example, ACL module 216 can include a list of source address(es) of network packets that are allowed to be forwarded to certain address(es). ACL module 216 can also include a list of source address(es) of network packets that are not allowed to be forwarded to certain address(es). Additional information can be included within ACL module 216 such as protocol version(s), identifying information, or other information.

Register(s) 236 can be coupled to MPLS module 208, L2 forwarding module 212, L3 routing module 214, ACL module 216, Parser 206, rewrite module 224, and/or statistics and redirect (SR) module 219, for example, in any combination. Register(s) 236 can collect information pertaining to number(s) of network packets that are forwarding individually by each module or by several of the modules. Non-limiting examples of use of register(s) 236 include counting a number of packets denied by ACL module 216 or a number of packets routed by L3 routing module 214. It should be understood that this information can be further delineated, such as a number of packets forwarded based on matching certain prefix(es), type(s) of packets, etc.

Crossbar 222 can be a switch for routing network packets that are received at one ingress interface port and processed through a processor pipeline 234 to transmit out through another egress interfaces 226 (e.g., interface 228, interface 230, interface 232).

SR module 219 can be configured to collect statistics information regarding operation of remaining modules of packet processor 234. In certain embodiments, SR module 219 can implement functionality of statistics collection logic 118 to collect and/or push statistical information gathered in register(s) 236 and associated with packet processor 234.

Scheduler 220 can control the buffering of packets and scheduling of operations within the network device 202 For example, scheduler 220 can implement a memory management unit to allocate available memory segments for buffering stored packets. Scheduler 220 can also implement a memory management unit to allocate packets from a buffer for final processing and egress. Scheduler 220 can provide appropriate metadata for a packet. Once a network packet has been scheduled, scheduler 220 can utilize crossbar 222, PHY interface, and/or a MAC layer interface to transmit network packets. Rewrite module 224 can be used to rewrite encapsulation or other information after a packet has traversed crossbar 222. The rewrite module 224 can rewrite fields in the packet to, for example, enter or exit a tunnel, modify QoS fields, or update a next-hop address.

Example Network Device with Hashing

Figure 3:
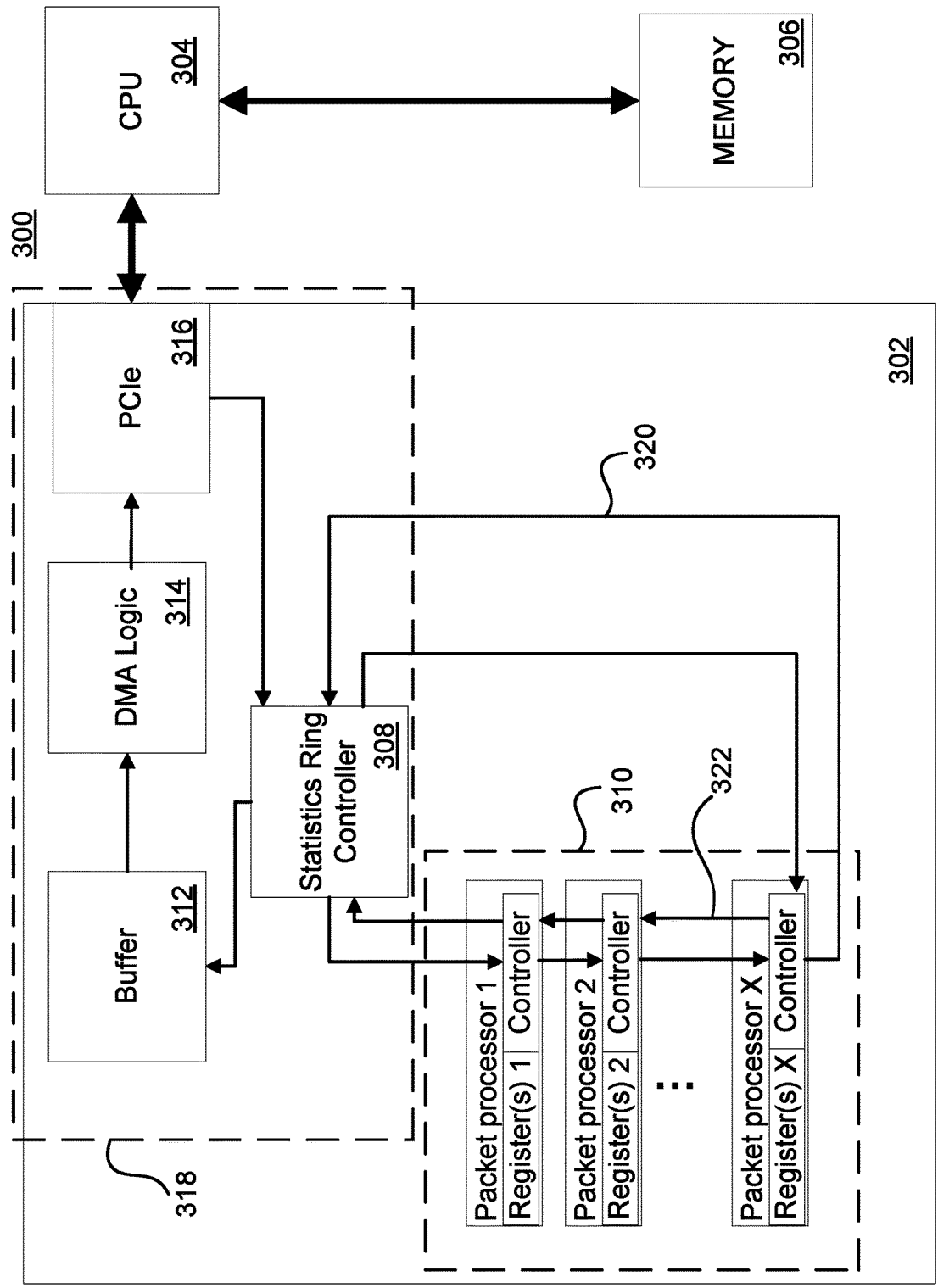
FIG. 3 illustrates an example network device with statistics collection logic.

FIG. 3 illustrates a logical diagram of a system 300 according to certain embodiments. System 300 can be similar to system 100. System 300 can include integrated circuit 302, CPU 304, and memory 306 which can be respectively similar to integrated circuit 102, CPU 104, and memory 106. Integrated circuit 302 can include PCIe controller 316 that can be similar to PCIe controller 112 and packet processors 310 that can be similar to packet processors 110.

Illustrated in FIG. 3 are a statistics ring controller 308, a buffer 312, Direct Memory Access (DMA) logic 314, and PCIe controller 316 that can each be part of statistics collection logic 318 (which can be similar to statistics collection logic 118) in any combination. Illustrated are registers of packet processors 310. Each packet processor 310 has associated logic or a controller that couples the registers with statistics ring controller 308 via a statistics ring bus 320. Integrated Circuit 302 can support a push model where statistics or other information are pushed from registers of packet processors 310 towards memory 306 (herein referred to as a "dump"). In certain embodiments, a timer can be used to push the information at regular intervals. The timer can be configured by CPU 304 to expire or trigger after a set amount of time, for example. The timer may be set to expire/trigger once or periodically. The timer can be maintained within integrated circuit 302 (such as by statistics ring controller 308, for example) and/or CPU 304 can maintain a timer and periodically command logic of integrated circuit 302 to collect and transmit information from the registers of packet processors 310 to memory 306. In certain embodiments, multiple timers may be maintained with associated logic for collecting varying sets of statistical information from the device (as described in more detail herein).

Each packet processor and/or a controller corresponding to register(s) of packet processors 310 can become a master on statistics ring bus 320. When an information dump is triggered, statistics ring controller 308 can sequentially grant each packet processor and/or controller of packet processor 310 master status. Granting master status to each packet processor and/or controller effectively induces the respective packet processor to forward the information from its respective (selected) registers to the buffer 312 the respective processing module with the master status writes the information from the respective one of the registers onto the statistics ring bus 320. In other words, when a packet processor/controller has master status, the processor/controller can utilize statistics ring bus 320 to transfer information from register(s) to buffer 312, for example. The remaining (non-master) processors/controllers may not be allowed to dump statistics information to statistics ring bus 320 until they are specifically granted master status by the statistics ring controller 308. Thus, bus collisions can be avoided on statistics ring bus 320. When a master completes moving statistics of the master's register(s), the master can signal to statistics ring controller 308 that the transfer is complete. Statistics ring controller 308 can then signal to a different packet processor/controller to become a master on statistics ring bus 320.

Buffer 312 can be a first in, first out (FIFO) buffer. Buffer 312 may be a slave on statistics ring bus 320. Therefore, only one slave (buffer 312) and one master may be active on statistics ring bus 320 for a given time period. After the information from the registers is collected in buffer 312, DMA logic 314 may, periodically or upon command, copy contents of buffer 312 to memory 306. DMA logic 314 can transfer data from the buffer to another memory location without intervention by a CPU. Thus, use of DMA logic 314 can provide capabilities to move information from buffer 312 to memory 306 without direct oversite by CPU 304, freeing CPU 304 from utilizing resources to move the information. As disclosed herein, use of the statistics ring controller 308, statistics ring bus 320, and DMA logic 314 can alleviate the need for CPU 304 to individually access statistics information dispersed across the integrated circuit in the packet processor registers and to move the statistics information from the packet processor registers to buffer 312 and then to memory 306.

In certain embodiments, CPU 304 may provide DMA logic 314 with an address of memory 306 that the DMA logic 314 can write statistics information to. CPU 304 can then access the statistics information from memory 306 and, if the information contains statistical counters, for example, aggregate the statistical counters into counters that may be larger than a respective one of the registers of integrated circuit 302.

In certain embodiments, the statistics ring controller 308 may specify a subset of registers out of a plurality of registers for each packet processor to be dumped on the statistics ring bus 320. For example, a first register of each packet processor may periodically be dumped into buffer 312. In certain embodiments, register(s) of only certain packet processor(s) may be selected for dumping. Statistics ring controller 308 can manage several different periods each respectively corresponding to a group of register(s) and/or packet processor(s). Thus, system 300 can periodically output groups of information at differing periods wherein each of the periods is implemented concurrently. Statistics ring controller 308 can select certain groups of registers and/or certain packet processors to push information into the buffer 312 by, for example, transmitting corresponding commands to the packet processors. For example, statitics ring controller 308 may select packet processor 2 for pushing data by transmitting a command onto statistics ring bus 320 that selects only packet processor 2. The same command may propagate through, and be ignored by, packet processor 1. A command may also select a group of packet processors instead of just a single processor in a similar fashion. Thus, statistics ring controller 308, by issuing commands, may control an order in which information is pushed from packet processors by sequentially selecting which packet processors (or groups of packet processors) push information. Similarly, groups of registers within packet processors can be selected via certain command(s).

In certain embodiments, a credit system can be used to keep track of available space of buffer 312 to store information from registers. For example, statistics ring controller 308 can assign a credit value to a variable passed between each of packet processors 310. For example, a credit value can indicate a number of available memory addresses within buffer 312 to store information from registers. Each of packet processors 310 can deduct from the credit value depending on, for example, a number of registers that are used to write to buffer 312 when that packet processor is a master of statistics ring bus 320. Alternatively, a number of bits or other information can be used to decrement the credit value. In some embodiments, packet processor(s) can provide credit value information in a direction reverse to a normal data direction flow of statistics ring bus 320. For example, path 322 can be used to transfer credit value information between packet processor X and packet processor 2 while information from register X is being used to populate buffer 312 via a "forward" direction of statistics ring bus 320. In this manner, statistics ring controller 308 can be provided with credit value information via a portion of statistics ring bus 320 while another portion of statistics ring bus 320 is used to transfer data to buffer 312.

In certain embodiments, each of packet processors 310 can include logic of statistics ring controller 308 (or other portions of statistics collection logic 318). Thus, the system can operate as a distributed controller wherein each packet processor passes control of the bus to another packet processor when data transfer is complete. Although a packet processor is used as an example, it should be understood that registers can be coupled to and/or correspond to various modules within an integrated circuit and the techniques of the disclosure can be used to transfer contents of the registers to a buffer and then to memory coupled to CPU 304 with minimal CPU 304 overhead.

It should be noted that in certain instances, dumping of register contents from packet processors during normal updating of registers due to the processing of network packets by the packet processor may lead to missed counts, a corrupted state or even catastrophic errors in some cases. For example, the packet processor pipeline may have network packets in flight within the packet processor pipeline that may result in alteration of register(s). In certain embodiments, a controller of a packet processor can request bubbles be inserted into the corresponding packet processor pipeline to allow information from the registers to be dumped from a pipeline during operation of the packet processor pipeline. In certain implementations, a bubble acts as a no-operation (or nop) and results in no updates to the registers for the stage of the pipeline for which the bubble passes through the packet processor pipeline. It is during the passing of the bubble through any particular stage of the pipeline when registers may be safely dumped from that stage of the pipeline without the risk of potential updates during that particular stage. In certain embodiments, a bubble can be an opportunity for a packet processor to read information from the register(s) and to push the information contained in register(s) to a buffer (such as buffer 312) or other memory location. In certain embodiments, the bubbles may be intentionally inserted by the packet processor for dumping statistics information. In other embodiments, bubbles inserted by the packet processor for other reasons besides dumping statistics information may be opportunistically used for dumping statistics information. The bubble can be inserted into operations of a processor pipeline when, for example, the processor pipeline is functioning to forward a network packet during live deployment within a network.

Example Dumping Schema

Figure 4:
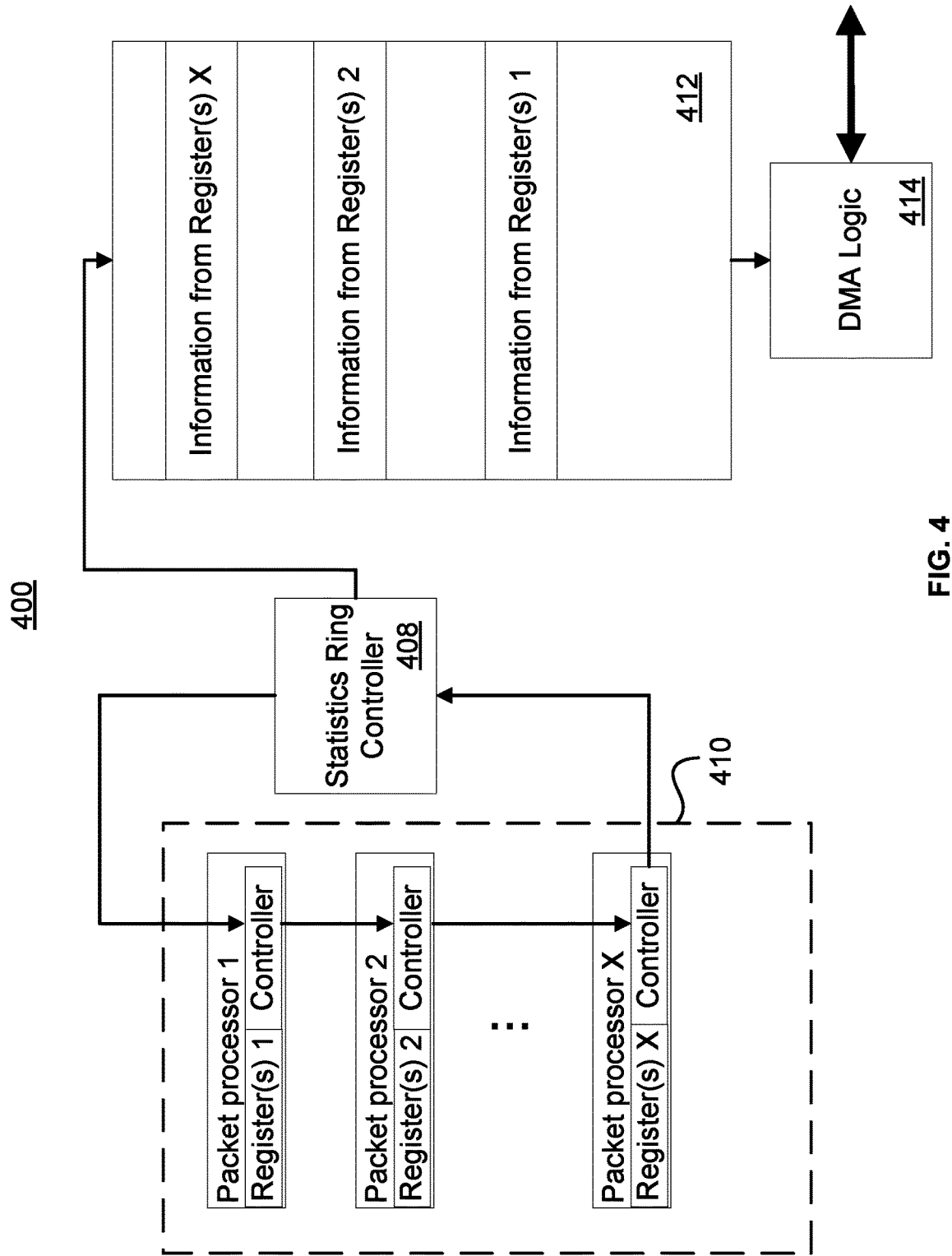
FIG. 4 illustrates an example schema for storing information in a buffer according to certain embodiments.

FIG. 4 illustrates a logical diagram of a system 400 according to certain embodiments. System 400 can be similar to system 300. System 400 includes statistics ring controller 408 that can be similar to statistics ring controller 308, packet processors 410 that can be similar to packet processors 310, buffer 412 that can be similar to buffer 312, statistics ring bus 420 that can be similar to statistics ring bus 320, and DMA Logic 414 that can be similar to DMA logic 314. As illustrated, an order in which information is dumped from registers of packet processors 410 can be dictated by a design of a ring or other bus. For example, using the techniques disclosed herein wherein each packet processor is sequentially given master status on a ring bus, buffer 412 may be populated in the sequential order in which the packet processors are given master status. Thus, as illustrated, information from register(s) 1 can be populated within buffer 412 first, then information from register(s) 2, and so forth. If buffer 412 is a FIFO, then information from register(s) 1 can be transferred prior to transfer of information from register(s) 2 by DMA logic 414 to memory for later evaluation by a CPU.

Figure 5:
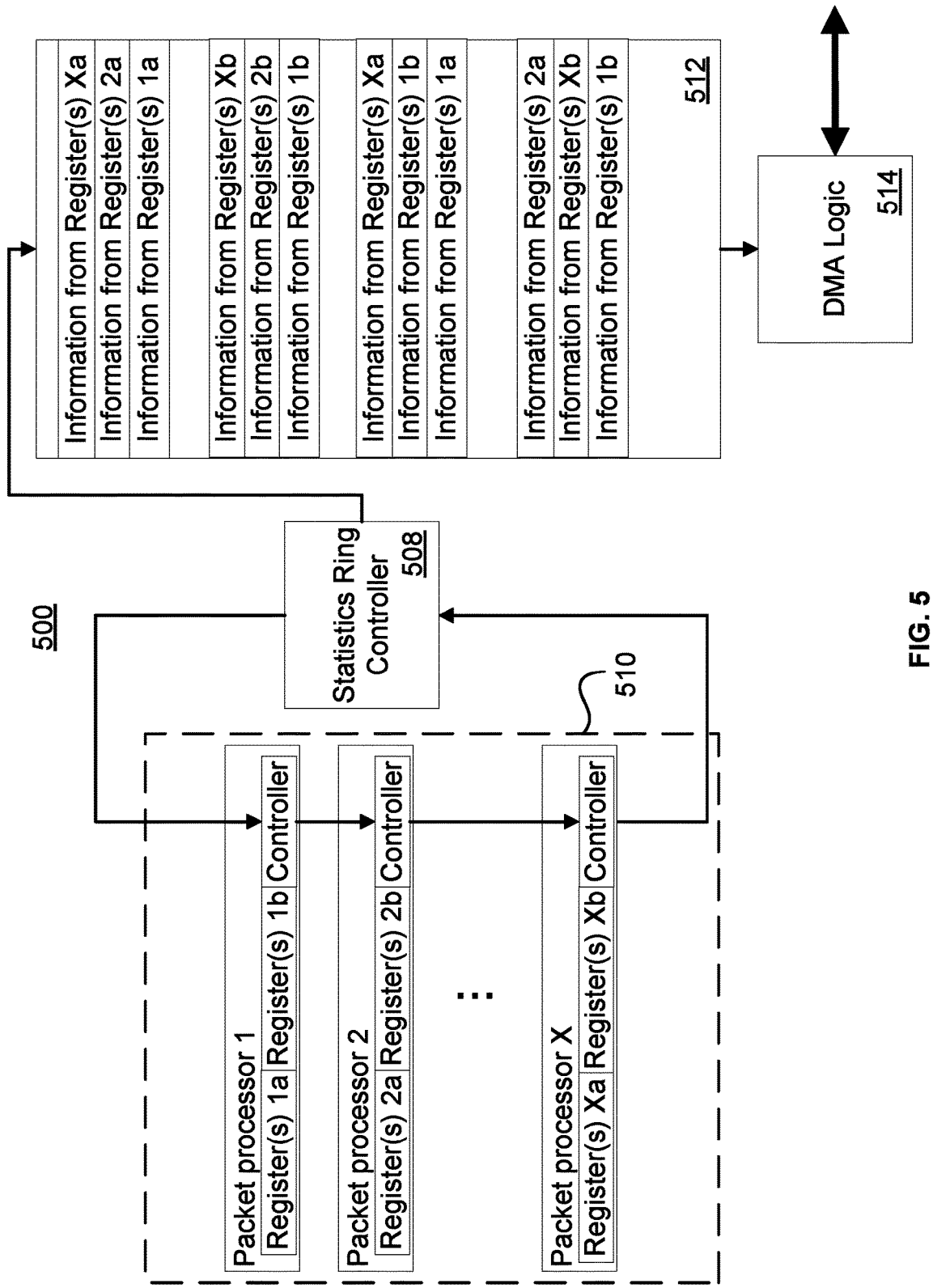
FIG. 5 illustrates another example schema for storing information in a buffer according to certain embodiments.

In certain embodiments, the CPU may program the statistics ring controller 408 or associated logic with a timer value for a period and an associated order of the packet processors 410 to dump statistics information from periodically. Furthermore, in certain embodiments, the CPU may also select or program a (static or configurable) group of registers to dump information from for each of the packet processors 410 selected. Once configured and activated, the statistics ring controller 408 may periodically (i.e., at the end of each sequential period determined by the timer value) and in the order configured by the CPU, assign each of the selected packet processors 410 as a master on the statistics ring bus 420, such that each of the selected packet processors 410 may dump the selected group of registers to buffer 412. In such an embodiment, the CPU a priori knows the order of the packet processors 410 and the order of the registers from each of the packet processors 410 in which the statistics information is dumped into the buffer 412 and consequently into the memory, since the CPU either programs such order or it is partially predetermined by the hardware architecture. Such a flexible and configurable architecture allows for data to be dumped periodically in a pre-determined and/or pre-configured order from several packet processors into memory with little data overhead (e.g., metadata describing the statistical information), since the order of the statistical information received from the integrated circuit is a priori known by the CPU. FIG. 5 below illustrates an example variation where certain groups of registers are selected for dumping from each of packet processors.

FIG. 5 illustrates a logical diagram of a system 500 according to certain embodiments. System 500 can be similar to system 300. System 500 includes statistics ring controller 508 that can be similar to statistics ring controller 308, packet processors 510 that can be similar to packet processors 310, buffer 512 that can be similar to buffer 312, and DMA Logic 514 that can be similar to DMA logic 314. FIG. 5 illustrates a variation in which several groups of registers are associated with each of packet processors 510. For example, as disclosed herein, statistics ring controller 508 can periodically select information to be pushed from register(s) from varying groups of packet processors and/or from various groups of registers corresponding to packet processors. For example, register(s) 1a and register(s) 1b are illustrated as being part of respective corresponding groups of registers. As illustrated, a first counter and/or command can enable dumping of information from a first group (in this example, corresponding to register(s) 1a, register(s) 2a, and register(s) Xa) to be populated within buffer 512 and eventually transferred to memory via DMA logic 514. A second counter and/or command can enable dumping of information from a second group (in this example, corresponding to register(s) 1b, register(s) 2b, and register(s) Xb) to be populated within buffer 512 and eventually transferred to memory via DMA logic 514. Also, as illustrated, various registers selected from within a group of registers corresponding to a packet processor and/or across differing packet processors can be selected for populating buffer 512. Also, a ring buffer can be utilized, as disclosed herein, to select various packet processors and/or registers. Use of a ring buffer can simplify routing of traces between controller(s) of packet processors that are distributed across an integrated circuit. The controller(s) of packet processors can be implemented within SR module 219, for example.

Thus, an order of information gathered from registers can be determined by selecting differing group(s) of registers and/or packet processors to be periodicities dumped. For example, a CPU may select two differing periodicity for respective groups of registers/packet processors for dumping. The CPU a priori knows the order in which information from the registers is provided to memory without inspecting and/or directing the order of information (e.g., statistics ring controller 508 may order the information in an order already known by the CPU and the CPU can initiate the transfer of the information in a predetermined order corresponding to a specific command from the CPU).

Example Methods

Figure 6:
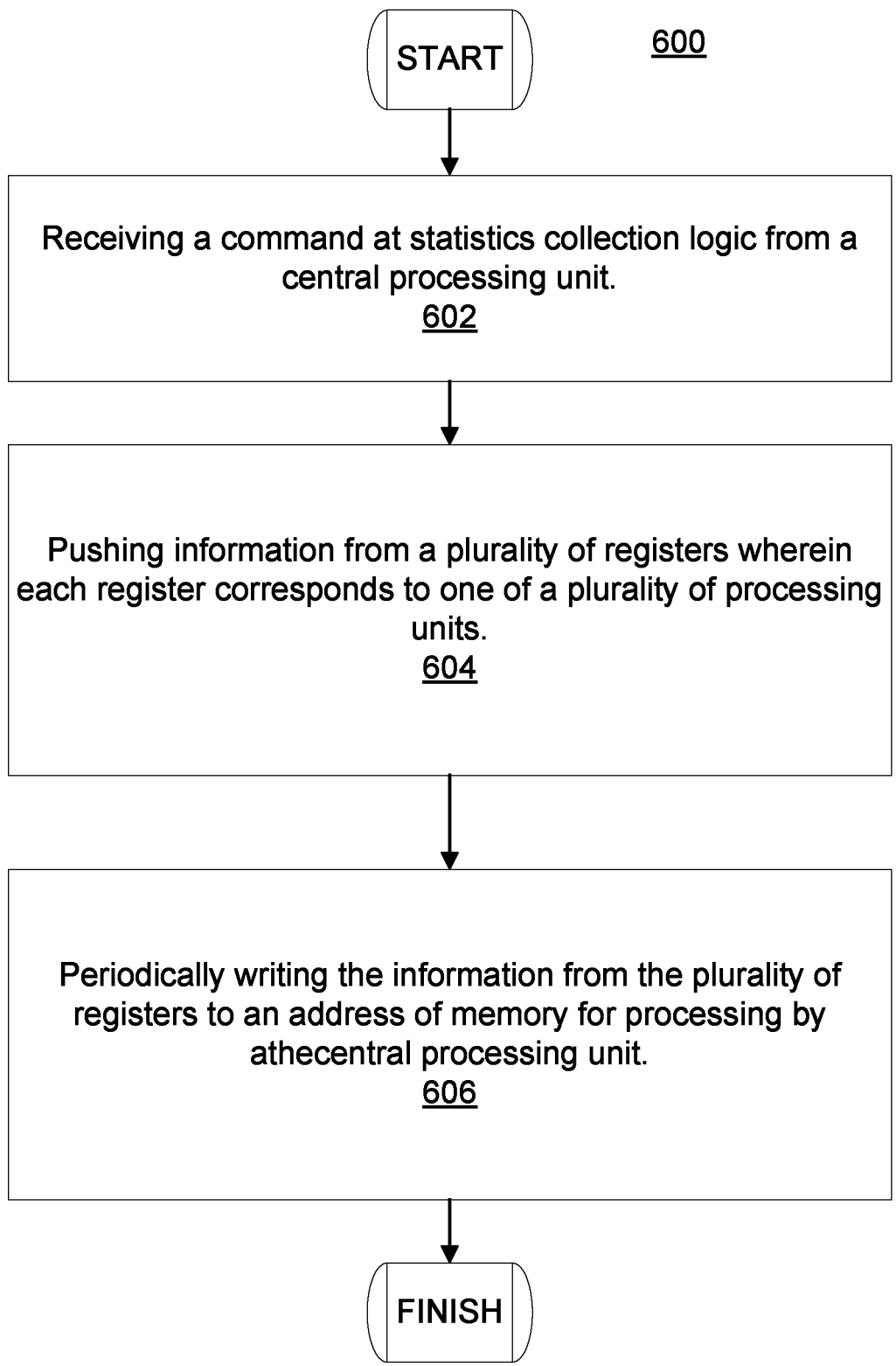
FIG. 6 illustrates an example flowchart for implementing techniques of the disclosure.

FIG. 6 illustrates an example flowchart 600 for implementing techniques of the disclosure. At 602, a command can be received at statistics collection logic (such as statistics collection logic 118, for example). The command can include one or more memory locations for dumping of information from register(s), information indicating frequenc(ies) or time period(s) at which one or more sets of registers will be dumped or other information pertaining to dumping of information from register(s). The command can encompass several commands. For example, a first command can be received at a controller (such as statistics ring controller 308) to configure the period(s) at which register(s) are selected for collection of information contained therein, a second command can be received at DMA logic (such as DMA logic 314) indicating period(s) at which information is to be transferred from a buffer to a memory and/or address(es) of memory to populate and a third command may activate the timer and associated mechanism in the controller for dumping statistical information. As disclosed herein, certain commands can indicate that certain registers of processing modules and/or certain registers shared across processing modules are to be dumped. At 604, the statistics collection logic can include processing module(s)/controller to push information from a plurality of registers. Each of the plurality of registers can correspond to a respective one of a plurality of processing modules (such as packet processors 110). The information can be collected using techniques disclosed herein and, for example, illustrated in FIG. 3 by using buffer 312 and/or statistics ring bus 320. At 606, the information can be written to memory, such as memory 106. The information can be written to the memory via DMA logic.

Computing Systems

Figure 7:
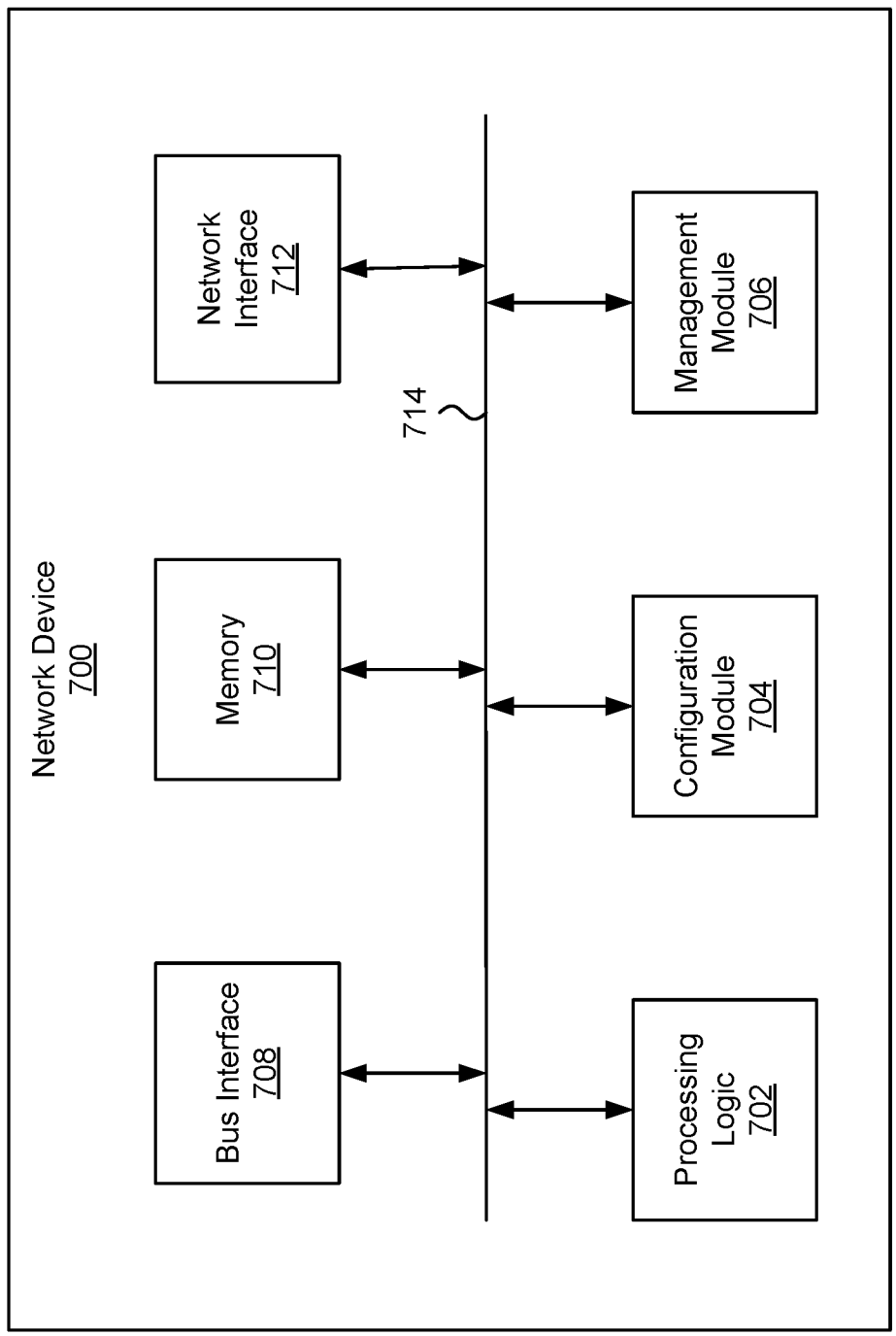
FIG. 7 illustrates an example of a network device, according to certain aspects of the disclosure.

FIG. 7 illustrates an example of a network device 700. Functionality and/or several components of the network device 700 may be used without limitation with other embodiments disclosed elsewhere in this disclosure, without limitations. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
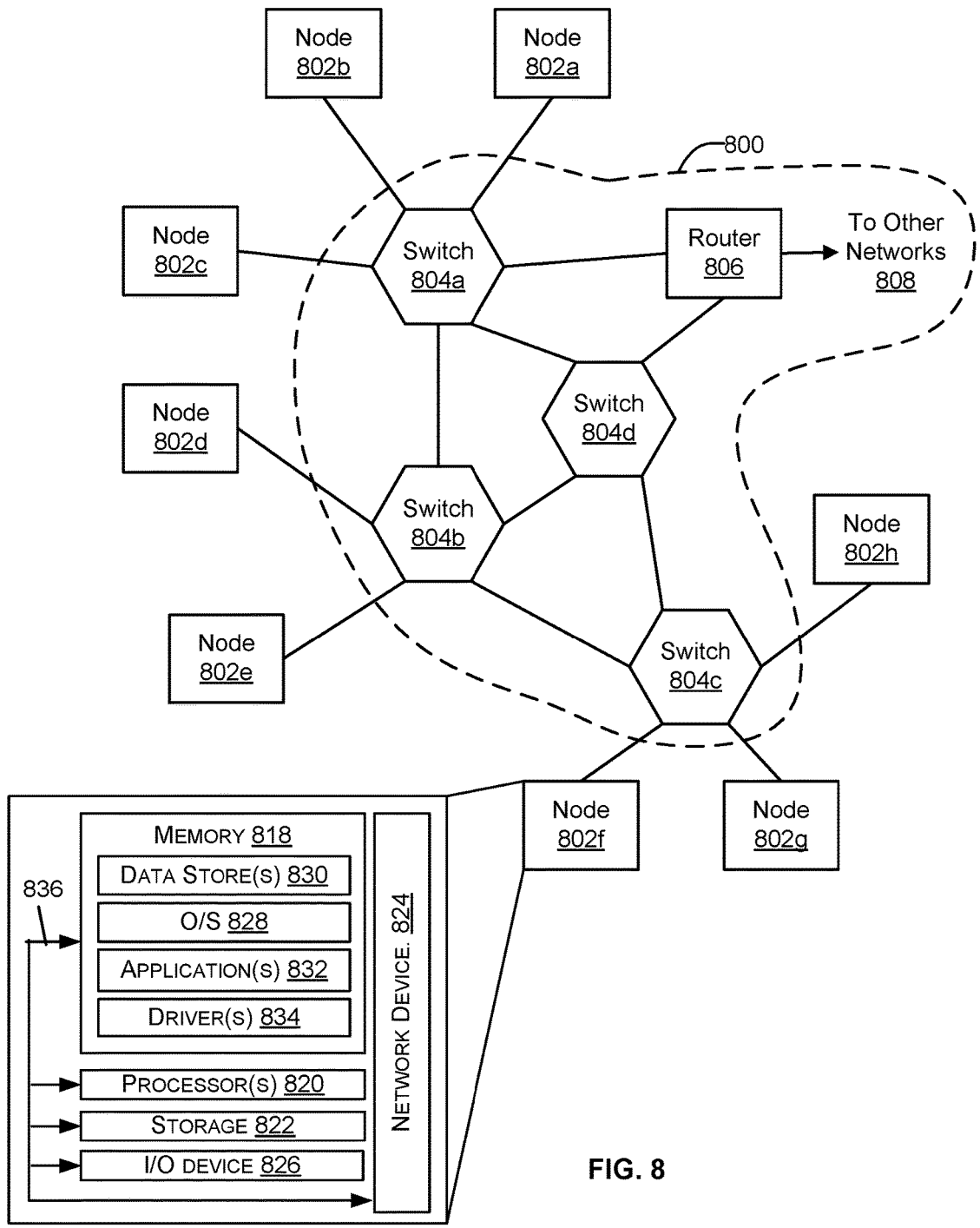
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s)

via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (optionally referred to herein as processing modules) (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device comprising:
    a memory;
    a central processing unit coupled to the memory;
    a switch application specific integrated circuit (ASIC) coupled to the central processing unit and the memory, the switch ASIC comprising:
        a buffer;
        registers configured to accumulate statistical information;
        network packet processors each comprising a processing module and corresponding to a respective one of the registers, each of the registers configured to collect the statistical information corresponding to network packets processed by the network packet processors;
        statistics collection logic coupled to the registers and the buffer via a ring bus, the statistics collection logic configured to:
            receive a first command from the central processing unit, the first command indicating that the statistics collection logic is to periodically provide the statistical information for processing by the central processing unit; and
            based on receiving the first command, periodically cause each of the processing modules to write the statistics information from the respective one of the registers to the buffer, wherein causing each of the processing modules to write the statistics information from each of the registers is performed without the statistics collection logic receiving commands from the central processing unit to individually cause each of the processing modules to forward the statistics information; and
        direct memory access (DMA) logic coupled to the buffer and the memory, the DMA logic configured to, based on the receiving a descriptor from the central processing unit, write the statistical information from the buffer to the memory for access by the central processing unit at a location in the memory indicated by the descriptor.

2. The network device of claim 1, wherein the statistics collection logic is further configured to:
    receive a second command, the second command indicating that the statistics collection logic is to periodically cause each of the processing modules to write the statistics information for processing by the central processing unit at a second period different from a first period provided based on the first command; and
    based on receiving the second command, periodically, at the second period, cause each of the processing modules to write the statistics information from the respective one of the registers to the buffer.

3. The network device of claim 2, wherein the registers are divided into a first set of registers and a second set of registers; and
    wherein the statistics collection logic is configured to:
        periodically, at the first period, cause each of the processing modules corresponding to the first set of registers to write the statistics information from first set of registers to the buffer; and
        periodically, at the second period, cause each of the processing modules corresponding to the second set of registers to write the statistics information from second set of registers to the buffer.

4. The network device of claim 1, wherein the central processing unit includes a processor, application specific integrated circuit (ASIC), digital signal processor (DSP), system on a chip (SoC), field programmable gate array (FPGA), or programmable logic device (PLD).

5. An integrated circuit comprising:
    processing modules, each of the processing modules corresponding to a respective one of a group of registers, each of the registers configured to collect information corresponding to a respective one of the processing modules;
    statistics collection logic coupled to a memory and the registers, the statistics collection logic configured to:
        receive a command to collect, from each of the registers, the information; and
        based on receiving the command, periodically cause each of the processing modules to write information from the respective one of the registers to the memory for access by a central processing unit, wherein causing each of the processing modules to write the information from each of the registers is performed without the statistics collection logic receiving commands from the central processing unit to respectively cause each of the processing modules to write the information.

6. The integrated circuit of claim 5, wherein each of the processing modules, upon writing the information from the respective one of the registers, clears the respective one of the registers.

7. The integrated circuit of claim 5, wherein the periodically causing each of the processing modules to write information from the respective one of the registers to a memory for access by a central processing unit includes providing each of the processing modules a master status on a bus coupling the processing modules to the statistics collection logic, and wherein the respective processing module with the master status writes the information from the respective one of the registers onto the bus.

8. The integrated circuit of claim 5, further comprising:
a bus configured to couple the registers to a buffer, wherein the bus has a width at least as wide as a widest one of the registers.

9. The integrated circuit of claim 5, wherein the statistics collection logic is configured to periodically cause each of the processing modules to write information from the respective one of the registers in an order; and
wherein the information from each of the respective one of the registers is written to the memory in the order.

10. The integrated circuit of claim 5, wherein the statistics collection logic is configured to periodically cause each of the processing modules to write information from the respective one of the registers from a first subset of the registers at a first period and periodically cause each of the processing modules to write information from the respective one of the registers from a second subset of the registers at a second period, the second period differing from the first period.

11. The integrated circuit of claim 5, wherein the statistics collection logic is configured to periodically write the information to an address of the memory, the address provided to the statistics collection logic by the central processing unit.

12. The integrated circuit of claim 5, wherein the statistic collection logic is configured to periodically cause each of the processing modules to write information from the respective one of the registers to a buffer; and
wherein the statistics collection logic writes the information stored in the buffer to the memory in an order that the information is stored in the buffer.

13. The integrated circuit of claim 5, wherein the registers are configured to accumulate counts of events that are associated with the processing modules; and
wherein the information includes the counts of events.

14. The integrated circuit of claim 5, wherein the processing modules are configured to process network packets including forwarding of network packets; and
wherein the information is associated with the processing of the network packets.

15. The integrated circuit of claim 14, wherein the information includes at least one of: a number of forwarded network packets, a number of forwarded network packets to a specific prefix, a number of network packet forwarded to a prefix, a number of dropped network packets, a number of bytes of information transferred associated with network packets, a number of errors associated with the network packets, a time associated with forwarding of network packets, or a state of one or more buffers associated with the respective processing modules.

16. The integrated circuit of claim 5, wherein the statistics collection logic is implemented on an application specific integrated circuit (ASIC), field programmable gate array (FPGA), or programmable logic device (PLD).

17. A method, comprising:
receiving, at statistics collection logic coupled to a memory and registers, a command;
based on receiving the command, periodically inducing, by the statistics collection logic, each of processing modules to move information from a respective one of the registers to the memory for access by a central processing unit, wherein inducing each of the processing modules to move the information from each of the registers is performed without the statistics collection logic receiving commands from the central processing unit to respectively induce each of the processing modules to forward the information; and
periodically writing the information to an address of the memory, the address selected by the central processing unit.

18. The method of claim 17, wherein the processing modules and the registers are disposed on a same integrated circuit die as the statistics collection logic.

19. The method of claim 17, wherein:
the information is generated by the processing modules; and
the information is periodically moved from each of the processing modules at a period to prevent overflow of the registers.

20. The method of claim 17, further comprising:
collecting the information from several of the registers in a buffer and wherein the information is written to the memory from the buffer.

21. The integrated circuit of claim 9, wherein the statistics collection logic is configured to transmit the information to the central processing unit following the order based on receiving a request to initiate transfer of the information from the central processing unit.

22. The integrated circuit of claim 7, wherein the bus is a ring bus shared by the processing modules; and
wherein each of the processing modules is provided with the master status on the ring bus sequentially to allow one processing module to write to the ring bus at a time.

* * * * *